United States Patent
Fara et al.

(10) Patent No.: US 12,379,481 B2
(45) Date of Patent: Aug. 5, 2025

(54) METHOD FOR DETERMINING AT LEAST ONE LOCATION FOR THE BACKSCATTERING OF AN AMBIENT SIGNAL

(71) Applicant: Orange, Issy-les-Moulineaux (FR)

(72) Inventors: Romain Fara, Châtillon (FR); Dinh Thuy Phan Huy, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 781 days.

(21) Appl. No.: 17/620,076

(22) PCT Filed: Jun. 15, 2020

(86) PCT No.: PCT/EP2020/066471
§ 371 (c)(1),
(2) Date: Dec. 16, 2021

(87) PCT Pub. No.: WO2020/254240
PCT Pub. Date: Dec. 24, 2020

(65) Prior Publication Data
US 2022/0369277 A1    Nov. 17, 2022

(30) Foreign Application Priority Data
Jun. 20, 2019 (FR) ..................................... 1906675

(51) Int. Cl.
*G01S 13/75* (2006.01)
(52) U.S. Cl.
CPC ................... *G01S 13/751* (2013.01)
(58) Field of Classification Search
CPC .... G01S 13/751; G01S 13/753; G01S 13/755; G01S 13/756; G01S 13/758; G01S 13/75; G01S 13/74
See application file for complete search history.

(56) References Cited

U.S. PATENT DOCUMENTS

2018/0275246 A1* 9/2018 Ma .................... G01S 13/765
2019/0079176 A1* 3/2019 Weissman ............ G01S 5/0036

FOREIGN PATENT DOCUMENTS

CN        107861100 A        3/2018

OTHER PUBLICATIONS

International Search Report and Written Opinion dated Jul. 2, 2020 for Application No. PCT/EP2020/066471.
(Continued)

*Primary Examiner* — Brian T Le
(74) *Attorney, Agent, or Firm* — Knobbe, Martens, Olson & Bear, LLP

(57) ABSTRACT

A method is described for determining at least one location for backscattering, by at least one transmitter device and to at least one receiver device, of an ambient radio signal, the transmitter device being associated with a zone, a backscattering and a non-backscattering operating state, and a working frequency band. Further, the method is implemented by the transmitter device when it is in the non-backscattering state and comprises travel of the transmitter device in at least one part of the zone, during which the transmitter device acquires, in the working band and in at least one location of the part of the zone, a measurement of electromagnetic power received by the transmitter device, and compares the measurement with a determined threshold, the location associated with the measurement being determined as a location for backscattering if the measurement is greater than the threshold.

14 Claims, 6 Drawing Sheets

(56) References Cited

OTHER PUBLICATIONS

Rachedi Ket al. "Demo Abstract: Real-Time Ambient Backscatter Demonstration" IEEE Infocom 2019, IEEE Conference on Computer Communications Workshops (Infocom Wkshps), IEEE, Apr. 29, 2019 (Apr. 29, 2019), pp. 987-988.

Van Huynh Nguyen et al. "Ambient Backscatter Communications: A Contemporary Survey" IEEE Communications Surveys & Tutorials, vol. 20, No. 4, Dec. 31, 2018 (Dec. 31, 2018), pp. 2889-2922.

* cited by examiner

METHOD FOR DETERMINING AT LEAST ONE LOCATION FOR THE BACKSCATTERING OF AN AMBIENT SIGNAL

RELATED APPLICATIONS

This application is the U.S. National Phase of Application No. PCT/EP2020/066471 entitled "METHOD FOR DETERMINING AT LEAST ONE LOCATION FOR THE BACKSCATTERING OF AN AMBIENT SIGNAL" and filed Jun. 15, 2020, which claims the benefit of French Patent Application No. 1906675, filed Jun. 20, 2019, each of which is incorporated by reference in its entirety.

PRIOR ART

This invention belongs to the general field of telecommunications. It more specifically relates to a method for determining at least one location for backscattering, by at least one transmitter device and to at least one receiver device, of an ambient radio signal. It also relates to a method for backscattering, by at least one transmitter device and to at least one receiver device, an ambient radio signal. The invention has a particularly advantageous, although in no way limiting, application for applications of "Internet of Things" (IoT) type.

Ambient backscattering technology is well-known at present. The main techniques on which this technology is based are described, in particular, in the document by N. Van Huynh and al. named "Ambient Backscatter Communications: A Contemporary Survey", in IEEE Communications Surveys & Tutorials, vol. 20, no. 4, pp. 2889-2922, Fourthquarter 2018.

Conventionally, the backscattering of an ambient signal is carried out between at least one transmitter device and at least one receiver device. Furthermore, and as envisioned until now, said devices each occupy a fixed position.

The ambient signal in question corresponds to a radio emitted, constantly or recurrently, by a source in a given frequency band. For example, it may be a television signal, a mobile telephony signal (3G, 4G, 5G), a WiFi signal, a WiMax signal, etc.

To communicate with a receiver device, a transmitter device makes use of the ambient signal to send data to said receiver device. More particularly, the transmitter device reflects the ambient signal toward the receiver device, where applicable by modulating it. The signal thus reflected is the so-called "backscattered signal", and is intended to be decoded by the receiver device.

The fact that no additional radio wave (in the sense of a wave other than that resulting from the ambient signal) is emitted by the transmitter device makes ambient backscattering technology particularly attractive. Specifically, the energy cost of a communication is thus optimized, which is currently of importance in the current context of the IoT where every object of modern life has the potential to become a communicating object.

To implement this technology, the transmitter device is equipped with at least one antenna configured to receive the ambient signal but also to backscatter it toward the receiver device.

The transmitter device is also associated with operating states including at least one so-called "backscattering" state (the transmitter device backscatters the ambient signal) as well as an opposite so-called "non-backscattering" state (the transmitter device is transparent to the ambient signal). These states correspond to configurations in which said at least one antenna is connected to separate impedances.

The receiver device, meanwhile, is configured to decode the backscattered signal. This being the case, and in practice, this decoding can only be implemented if the variation in electromagnetic power received by the receiver device, between times at which the transmitter device is respectively in the non-backscattering state and in a backscattering state, exceeds a predetermined threshold, the so-called "power threshold".

For the rest of the description, such a variation in electromagnetic power received by the receiver device, between times at which the transmitter device is respectively in the non-backscattering state and in a backscattering state, is the so-called "power contrast" C_P.

However, the existence of such a power threshold, in addition to the fact that the transmitter and receiver devices occupy fixed positions, turns out to be problematic for guaranteeing effective communication between said devices.

Specifically, these devices are generally positioned in a complex propagation environment comprising elements (walls, trees, ground etc.) liable to generate reflections and diffractions of waves emitted by the source. However, these reflections and diffractions interfere with one another, such that the power distribution generated by the waves coming directly from the source (i.e. the waves which are not backscattered) is not uniform. Thus, this power distribution has areas where the power is at a local maximum or else, conversely, at a local minimum.

FIG. 1 schematically shows a map of distribution of the electromagnetic power radiated by a source. Such a map was generated in a manner known per se by digital simulation considering a model of wave propagation corresponding to a Rayleigh distribution. The aspects related to the modelling of the wave propagation are well-known to those skilled in the art and will consequently not be recalled here.

In the example of FIG. 1, said source corresponds to a television tower emitting in a frequency band equal to [583 MHz, 590 MHz]. Said map corresponds to a square of sides equal to 1 m25. The levels of radiated power are shown using level lines, it being understood that the more converging lines appear in an area of the map, the more this area corresponds to a local radiated power minimum.

As illustrated in FIG. 1, the power distribution has a plurality of local minima and therefore in fine also a plurality of local maxima. By way of example, areas Z_1, Z_2, Z_3 and Z_4, each including a local radiated power maximum (power substantially equal to 5 dB), are indicated. Each area Z_i, for i varying from 1 to 4, covers the section of map contained inside the dotted curve surrounding the abbreviation "Z_i". Two other areas Z_5 and Z_6, each including a local radiative power maximum (power substantially equal to −6 dB), are also indicated, using arrows. Each area Z_i, for i varying from 5 to 6, covers the section of map contained inside the dotted curve pointed to by the arrow associated with said area Z_i.

Henceforth, it will be understood that if the transmitter device occupies a position in an area where the radiative power is at a local minimum (for example area Z_5 or area Z_6), said contrast power cannot exceed the threshold. Consequently, the receiver device cannot decode the backscattered signal, so communication between these devices fails.

SUMMARY OF THE INVENTION

This invention has the aim of remedying all or part of the drawbacks of the prior art, particularly those set out above, by making provision for a solution which makes it possible to determine a location of at least one transmitter device, at which the power contrast is high enough to guarantee that the receiver device can decode a signal backscattered by said at least one transmitter device, and thus optimize communication between these devices.

For this purpose, and according to a first aspect, the invention relates to a method for determining at least one location for backscattering, by at least one transmitter device and to at least one receiver device, an ambient radio signal emitted in a frequency band, the so-called "emission band", said transmitter device being associated with:
- an area which is a function of said emission band,
- operating states, including at least one "backscattering" state and an opposite so-called "non-backscattering" state,
- a frequency band, the so-called "work band", included in said emission band.

Furthermore, said method is implemented by the transmitter device when the latter is in the non-backscattering state and includes:
- a step of the transmitter device traveling around at least one part of said area,
- during the traveling of the transmitter device, a step of acquiring, in the work band and in at least one location of said part, an electromagnetic power measurement received by said transmitter device,
- a step of comparing said at least one measurement with a predetermined threshold, the location associated with said measurement being determined as being a location for backscattering if said measurement is above said threshold.

Thus, the determining method according to the invention makes it possible to envision the transmitter device traveling within at least a part of said area. In other words, and unlike methods of the prior art, the transmitter device is not obliged to remain fixed and can advantageously move in the aim of detecting a location at which the received electromagnetic power is high enough, so that the power contrast can in turn become high enough and thus ensure correct communication by backscattering with the receiver device.

The determining method according to the invention therefore offers the possibility, in the case where a location is determined, of avoiding the failure of a communication between the transmitter device and the receiver device. The invention thus advantageously overcomes the disadvantages presented by the solutions of the prior art and which are related to the stationarity of the transmitter and receiver devices.

In particular modes of implementation, the method for determining at least one location can further include one or more of the following features, taken in isolation or in any technical possible combination.

In particular modes of implementation, the transmitter device travels around the entire area.

Proceeding in this way maximizes the probability of finding a local power maximum during the travel of the transmitter device. Specifically, the more the more extensive the area traveled, the greater the probability of finding a local power maximum.

In particular modes of implementation, the transmitter device travels around autonomously or with assistance.

In particular modes of implementation, a plurality of locations is considered during the acquiring step, the measurements being acquired according to a predetermined time increment or according to a predetermined distance increment between each location in said part of the area.

In particular modes of implementation, a plurality of locations is considered during the acquiring step, said method including, when several locations are determined as being locations for backscattering, a step of selecting, from among said locations, a so-called "optimal location", for which the associated power measurement is at a maximum among the power measurements associated with said locations.

Said optimal location therefore denotes a location at which the power received from the source is maximized, such that the power contrast shall also be at a maximum when the transmitter device will occupy said optimal location to backscatter. In this way, communication between the transmitter and receiver devices will be optimized.

In particular modes of implementation, a plurality of transmitter devices is considered, the steps of said method being implemented by each of said devices when said transmitter devices are simultaneously in the non-backscattering state.

According to a second aspect, the invention relates to a method for backscattering, by at least one transmitter device and to at least one receiver device, an ambient radio signal emitted in a frequency band, the so-called "emission band", said transmitter device being associated with:
- an area that is a function of said emission band,
- at least two operating states, a so-called "backscattering" state and an opposite so-called "non-backscattering" state,
- a frequency band, the so-called "work band" included in said emission band.

Furthermore, said method includes:
- a step of determining at least one location for backscattering according to a determining method according to the invention,
- when at least one location has been determined and the transmitter device is in the non-backscattering state, a step of moving the transmitter device around in the area, such as to reach a fixed position that is a function of said at least one predetermined location,
- a step of backscattering, by the transmitter device, of the ambient signal.

Thus, once at least one location has been determined, the transmitter device can move toward such a location in which it will occupy a fixed position, for example during a predetermined period, to backscatter the ambient signal addressed to the receiver device.

In particular modes of implementation, the backscattering method can further include one or more of the following features, taken in isolation or in any technically possible combination.

In particular modes of implementation, when an optimal location is determined, said fixed position is identical to the position of the transmitter device when it has taken the electromagnetic power measurement associated with said optimal location.

In particular modes of implementation, the steps of determining at least one location, of moving the transmitter device such as to reach a fixed position, and backscattering are iterated recurrently.

Such arrangements make it possible to take into account the variability of the environment in which the transmitter device and the receiver device are positioned.

Typically, elements liable to reflect and/or diffract the waves coming from the ambient signal may see their respective positions modified in the immediate environment of the transmitter and receiver devices. As a purely illustrative example, if the transmitter and receiver devices are placed in an apartment room and an item of furniture is moved, a location previously determined as being capable of backscattering may no longer be appropriate. The term "no longer be appropriate" here refers to the fact that the power contrast can no longer exceed the decoding threshold, the power distribution having been modified due to the movement of the furniture item.

Thus, envisioning a recurring implementation of the backscattering method according to the invention advantageously allows the transmitter device to adapt to an environment liable to change.

According to a third aspect, the invention relates to a computer program including instructions for implementing a method for determining at least one location according to the invention or a backscattering method according to the invention when said program is executed by a computer.

According to a fourth aspect, the invention relates to a recording medium readable by a computer on which is recorded a computer program according to the invention.

According to a fifth aspect, the invention relates to a transmitter device for backscattering toward at least one device for receiving an ambient radio signal emitted in a frequency band, the so-called "emission band", said transmitter device being associated with:
  an area that is a function of said frequency band,
  operating states, including at least one "backscattering" state and an opposite so-called "non-backscattering" state,
  a frequency band, the so-called "work band", included in said emission band.
Furthermore, said transmitter devices includes:
  means for moving through this area,
  acquiring means, configured to acquire, in the work band and in at least one location of said area, when the transmitter device is in the non-backscattering state, an electromagnetic power measurement received by said transmitter device,
  a comparing module, configured to compare said at least one measurement with a predetermined threshold,
  a determining module, configured to determine, when said at least one measurement is above said threshold, that the location associated with said at least one measurement is a location for backscattering.

In particular embodiments, said transmitter device includes a steering module, configured to control, when at least one location for backscattering has been determined, a movement of the transmitter device in the area, such as to reach a fixed position as a function of said at least one predetermined location.

According to a sixth aspect, the invention relates to a communication system including at least one transmitter device according to the invention and at least one receiver device.

BRIEF DESCRIPTION OF THE DRAWINGS

Other features and advantages of this invention will become apparent from the description given below, with reference to the appended drawings which illustrate an exemplary embodiment thereof without any limitation. In the figures.

DESCRIPTION OF THE EMBODIMENTS

Figure 2:
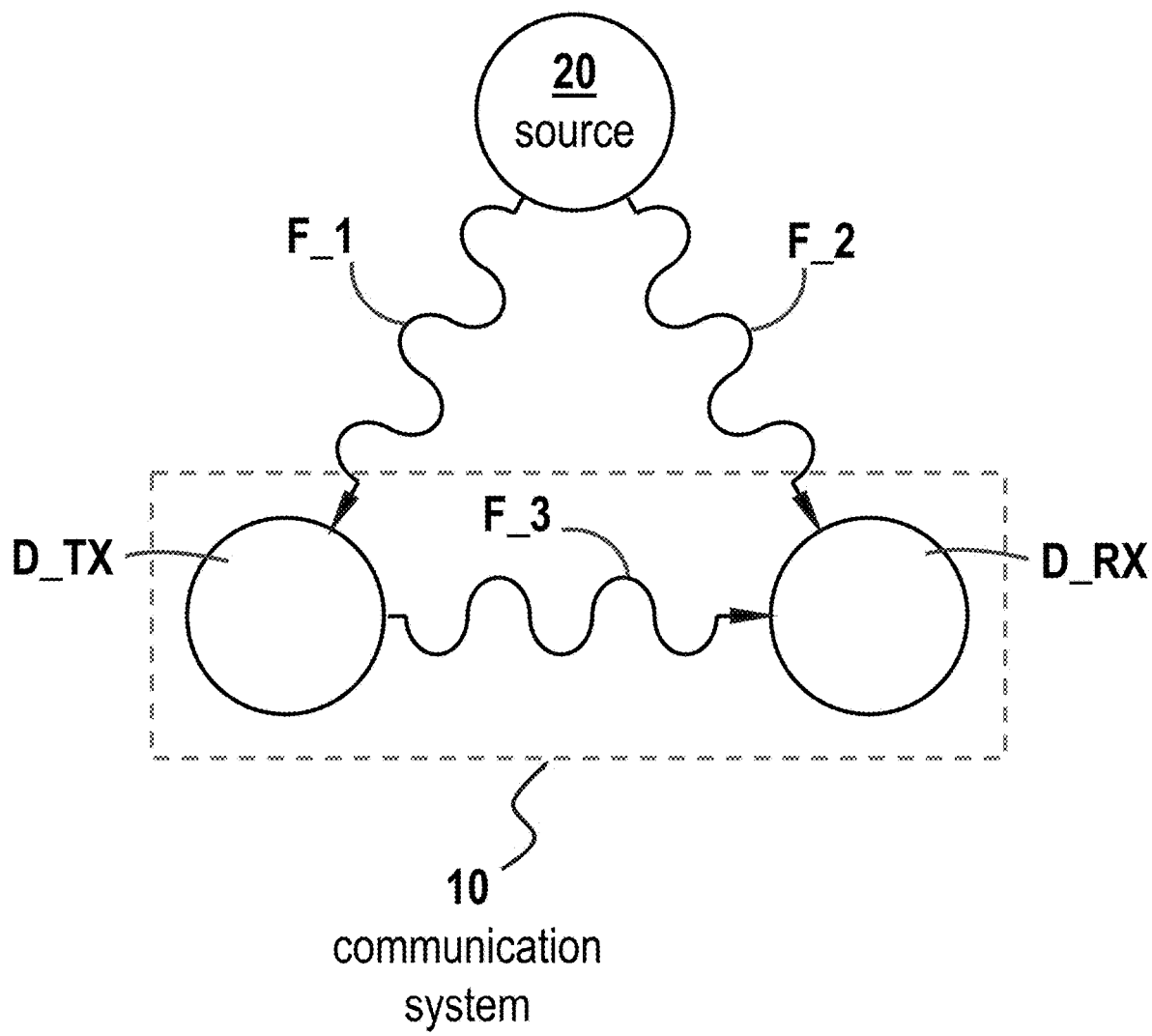
FIG. 2 schematically represents, in its environment and in a particular embodiment, a communication system 10 according to the invention.

FIG. 2 schematically represents, in its environment and in a particular embodiment, a communication system 10 according to the invention.

The communication system 10 includes a transmitter device D_TX along with a receiver device D_RX which remains fixed.

In the rest of the description, and as illustrated by the embodiment of FIG. 2, it is considered without limitation that the communication 10 comprises a single transmitter device D_TX and a single receiver device D_RX. It should however be specified that the invention is also applicable to a communication system comprising a plurality of transmitter devices and/or a plurality of receiver devices.

The operation of the communication system 10 is based on ambient backscattering technology. This technology consists, in a manner known per se, in the backscattering, by the transmitter device D_TX and toward the receiver device D_RX, an ambient radio signal emitted in a predetermined frequency band, the so-called "emission band". In other words, to communicate with the receiver device D_RX, the transmitter device D_TX makes use of said ambient signal to send data to said receiver device D_RX. More specifically, the transmitter device D_TX reflects the ambient signal toward the receiver device D_RX, optionally while modulating it. The signal thus reflected is the so-called "backscattered signal" and is intended to be decoded by the receiver device D_RX.

The aspects relating to the emission of data by backscattering addressed to the receiver device D_RX, along with those relating to the decoding techniques implemented by the latter, are known to those skilled in the art and depart from the scope of this invention. Consequently, they will not be further detailed here.

The ambient signal corresponds to a radio electrical signal emitted, constantly or else recurrently, by at least one source 20. The remainder of the description, and as illustrated by FIG. 2 considers without any limitation the case where the ambient signal is only emitted by a single source. However, no limitation is attached to the number of sources that may be considered within the scope of this invention, as long as these sources emit in respective bands, the intersection of which is not empty and which furthermore intersects a frequency band associated with the transmitter device D_TX, as described hereinafter in more detail.

The term "radio signal" here refers to an electromagnetic wave propagating by wireless means, the frequencies of which are contained in the conventional spectrum of radio waves (a few hertz to several hundred gigahertz).

The rest of the description addresses more specifically, but without any limitation, a UHF (Ultra-High Frequency) signal emitted by a television tower in the emission band [583 MHz, 590 MHz].

It should however be specified that the invention remains applicable to all types of radio signal, such as for example a mobile telephony signal (for example 3G, 4G, 5G), a Wi-Fi signal, a WiMax signal, a DVB-T signal, etc.

Moreover, no limitation is attached to the structural forms that can be taken by the source 20 and the receiver device D_RX respectively. By way of example without any limitation, the following configurations can be envisioned (as a function, of course, of the emission band in question):

- the source 20 is a base station, and the receiver device D_RX is a smartphone,
- the source 20 is a smartphone, and the receiver device D_RX is a base station,
- the source 20 is a smartphone, and the receiver device D_RX is also a smartphone,
- the source 20 is a domestic gateway (also called an "Internet box") emitting a WiFi signal, and the receiver device D_RX is a smartphone.

The waves carried by the signals considered in this invention are shown conceptually by the wavy arrows in FIG. 2. More specifically, the arrows F_1 and F_2 show waves of the ambient signal emitted by the source 20. The waves shown by the arrow F_1 are backscattered by the transmitter device D_TX, and the waves of the backscattered signal are here shown by the arrow F_3. The waves shown by the arrow F_2, meanwhile, are not backscattered and arrive directly at the receiver device D_RX. Note moreover that only the waves shown by the arrow F_3 carry the data that the receiver device D_RX is intended to decode.

It should be noted that FIG. 2 is given purely by way of illustration. Thus, it does not for example include any element liable to reflect or diffract the waves of the ambient signal. In this sense, FIG. 2 is intended as a simplified version of the environment in which the transmitter devices D_TX and receiver devices D_RX are located. One should however bear in mind that this environment is generally of complex configuration and includes elements (walls, trees, ground etc.) able to generate such reflections and diffractions.

As mentioned beforehand, the transmitter device D_TX and the receiver device D_RX are respectively configured in order to communicate amongst themselves by ambient backscattering.

Figure 3:
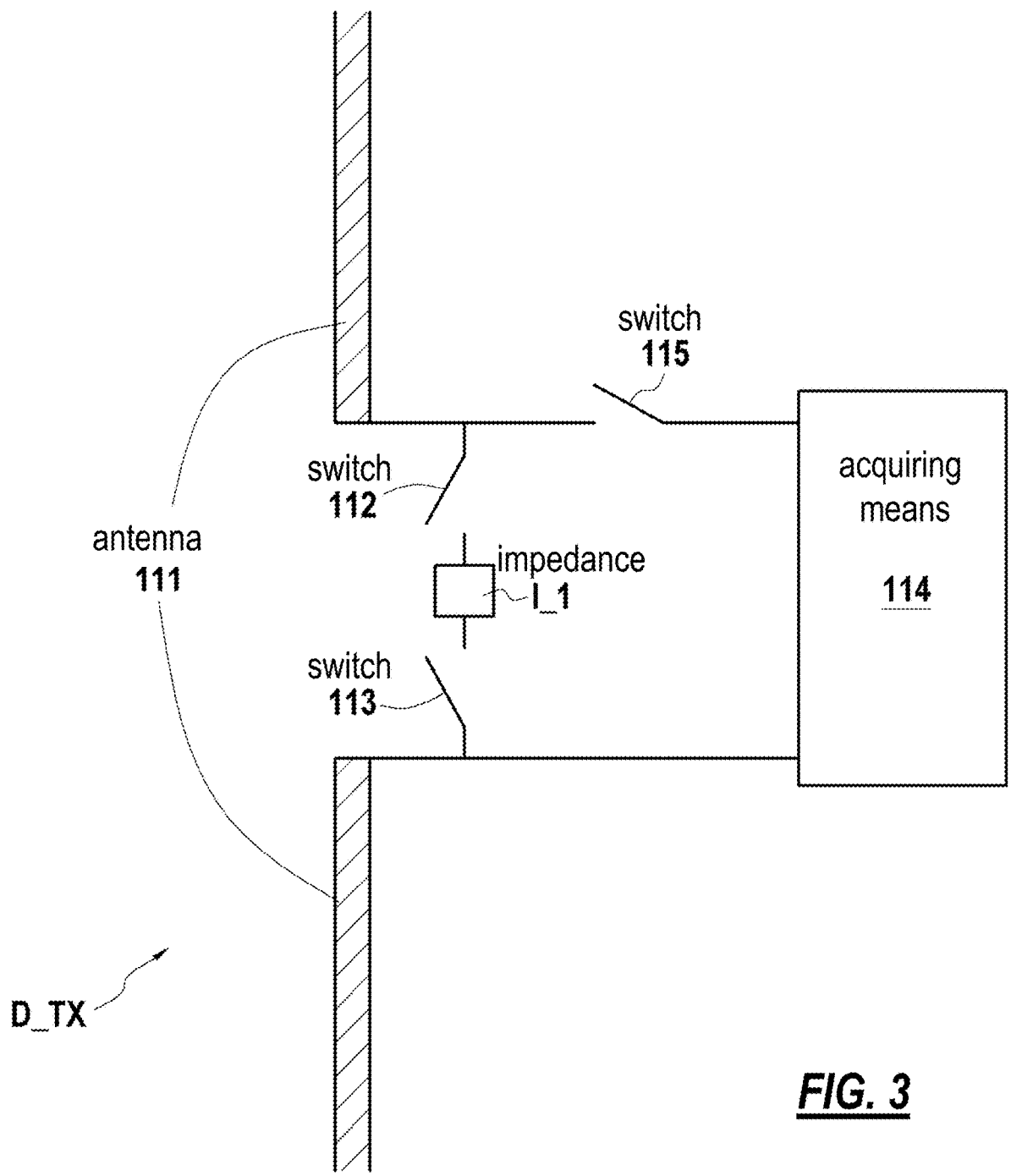
FIG. 3 schematically represents a partial view of an exemplary embodiment of a transmitter device D_TX according to the invention.

FIG. 3 schematically represents a partial view of an exemplary embodiment of the transmitter device D_TX of FIG. 2.

As illustrated by FIG. 3, the transmitter device D_TX is equipped with an antenna 111 configured, in a manner known per se, to receive the ambient signal but also backscatter it toward the receiver device D_RX. It should be noted that no limitation is attached to the number of antennas that can equip the transmitter device D_TX.

In the example of FIG. 3, said antenna is constructed such as to present a largest dimension substantially equal to half the wavelength associated with a frequency F_C contained in the emission band. More particularly, the frequency F_C under consideration here is the central frequency of the emission band [583 MHz, 590 MHz], or 586.5 MHz. Thus, said greatest dimension of the antenna 111 is substantially equal to 25 cm.

In practice, the transmitter device D_TX is associated with a frequency band, the so-called "influence band", which corresponds to the frequency band in which the antenna 111 is able to receive/backscatter signals. Thus, in the example given above with reference to FIG. 3, said influence band corresponds to a frequency interval centered on said frequency F_C, and the amplitude of which is equal to a sampling frequency F_E applied by an analog/digital converter equipping the transmitter device D_TX (for example integrated into acquiring means as described further on) to the signals liable to be received. Put still otherwise, said influence band is equal to [F_C−F_E/2, F_C+F_E/2].

For example, said sampling frequency is equal to 1 MHz, and the influence band is then equal to [585.5 MHz, 587.5 MHz]. It is then noted that the influence band is included in the emission band associated with the source 20. Due to this inclusion, said influence band is described as a "work band" B_T. The term "work band" here refers to the fact that the transmitter device D_TX is compatible with the source 20, namely therefore that the backscattering can be carried out for any frequency included in said work band B_T.

Nothing however precludes the consideration of other values for the frequencies F_C and F_E. It is nonetheless obvious that for the emitter device D_TX to be able to backscatter the ambient signal, it is suitable that said influence band is of non-empty intersection with said emission band, the work band B_T hence corresponding to this intersection. Thus, if the transmitter device D_TX is configured such as to be associated with an influence band containing the emission band, then the work band B_T of said emitting device D_TX is defined as being equal to the emission band.

The transmitter device D_TX is also associated with operating states, namely a so-called "backscattering" state (the transmitter device D_TX backscatters the ambient signal) along with an opposite so-called "non-backscattering" state (the transmitter device D_TX is transparent to the ambient signal). These states correspond to configurations wherein said antenna 111 is connected to separate impedances. This is typically a positive, or even zero, impedance, in the case of a backscattering state, and conversely a theoretically infinite impedance in the case of the non-backscattering state.

For example, as illustrated by FIG. 3, the emitter device includes two switches 112, 113 configured such as to be able to connect the antenna 111, as a function of their respective positions, an impedance I_1, for example equal to 0 Ohms, or else equal to R Ohms where R is a strictly positive finite value. When at least one of the switches 112, 113 is not connected to the impedance I_1, the antenna 111 is in a so-called "open circuit" configuration corresponding to said non-backscattering state.

The transmitter device D_TX is also associated with an area Z_T determined as a function of said emission band. Such an area Z_T corresponds to a geographical space within which the transmitter device D_TX can move from an initial location that it occupies, to find a location in which the distribution of power radiated by the source 20 is at a local maximum.

Said area Z_T is for example defined at the time of the design of the transmitter device D_TX.

Alternatively, said area Z_T is then defined such that the transmitter device D_TX also occupies a position in situ, according to a type of source the ambient signal of which one wishes to backscatter. For this purpose, a message including an item of information defining said area Z_T can be transmitted, for example by an operator, to said transmitter device D_TX.

Preferably, said area Z_T has at least one dimension substantially equal to half the wavelength associated with a frequency contained in the emission band, preferably a frequency corresponding to the central frequency of said emission band. The fact of considering such a value for said at least one dimension results from the fact that the local maxima of the distribution of power radiated by the source 20 (such as for example those associated with areas Z_1, Z_2, Z_3 and Z_4 in FIG. 1) are on average separated pairwise by a distance equal to half the wavelength associated with the central frequency of the emission band. It will thus be understood that the fact of considering an area Z_T having at least one such dimension advantageously allows the transmitter device D_TX, to maximize the probability of finding a local maximum on moving in said area Z_T.

Figure 1:
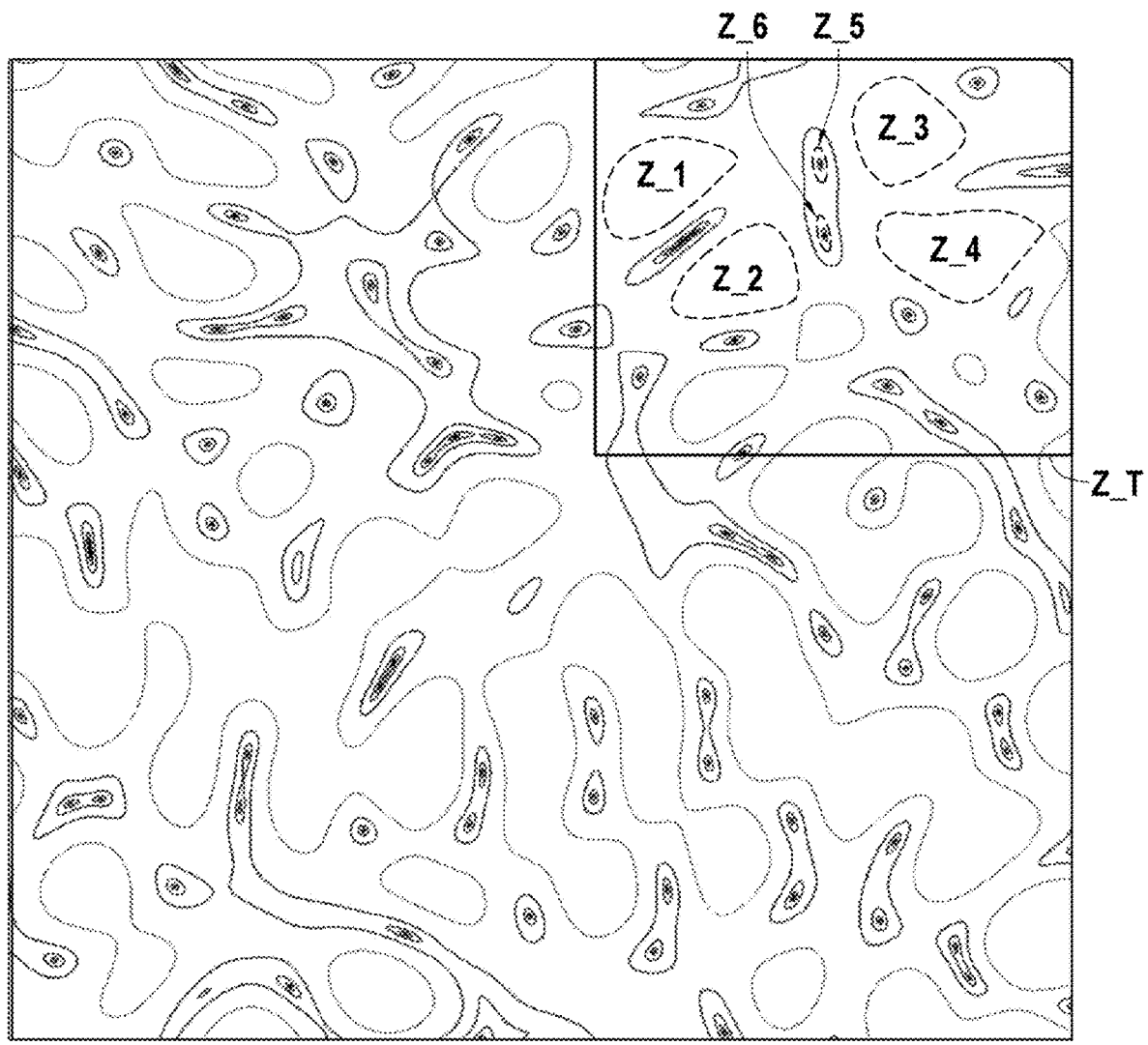
FIG. 1 schematically represents one map of distribution of the electromagnetic power radiated by a source corresponding to a television tower.

By way of example without any limitation, such an area Z_T is illustrated in FIG. 1. In this example, the frequency under consideration in the emission band is said frequency F_C, such that said at least one dimension of the area Z_T is equal to 25 cm. More specifically, the area Z_T here corresponds to a square, the side length of which is equal to 25 cm. Furthermore, the transmitter device D_TX occupies an initial location corresponding to the center of this square. Note that this initial location is determined independently of all a priori knowledge of the distribution of power radiated by the source 20.

Nothing however precludes, following other examples not detailed here, considering an area of a shape different from a square, and having one or more (or even all) of its dimensions lesser or greater than half the wavelength associated with a frequency contained in the emission band. Furthermore, no limitation is attached to the initial location occupied by the transmitter device D_TX within the area Z_T. For example, in the case where the area Z_T is a square, said initial location may correspond to a corner of this square.

The transmitter device D_TX further includes means (not shown in the figures) for moving in said area Z_T, and more broadly in the whole environment in which the transmitter D_TX and receiver devices D_RX are located.

For example, said moving means include driving means, such as for example at least one electrical motor, as well as guiding means, such as for example wheels. Nothing however precludes the consideration of other driving means, such as for example a thermal engine, as well as other guiding means, such as for example caterpillar tracks.

Preferably, the transmitter device D_TX takes the form of a robot including an electrical motor and wheels. For example, such a robot is intended to move around in a hangar within which goods are stored, these goods being able to be extracted from the hangar, one by one, in order to be dispatched following orders from consumers. Said robot is also able to update the inventory of the stock of goods in the hangar. Hence, the data backscattered toward the receiver device D_RX, which can here take the form of a smartphone owned by a person, can be representative of said inventory at a given time.

The transmitter device D_TX also includes acquiring means 114 configured to acquire, in the work band B_T and in least one location of said area Z_T, a measurement of the electromagnetic power received by said transmitter device D_TX.

Conventionally, said acquiring means 114 include an acquiring chain connected to a sensitive element configured to supply an analog electrical signal representative of the electromagnetic power measured. In this exemplary embodiment, said sensitive element corresponds to the antenna 111 equipping the transmitter device D_TX.

Said acquiring line for example includes an acquisition card configured to condition said electrical signal. The conditioning implemented by the acquisition card for example includes, in a manner known per se, amplification and/or filtering and/or current-power conversion. In general, the configuration of such acquiring means 114 is well-known to those skilled in the art and will therefore not be further detailed here.

Said acquiring means are further configured to perform the acquisition of a power measurement when the transmitter device D_TX is in the non-backscattering state.

For example, and as illustrated by FIG. 3, said acquiring means 114 are connected to the antenna 111 via a switch 115. This switch 115 is controlled such as to connect said acquiring means 114 to the antenna 111 when said antenna is in said open circuit configuration, i.e. when at least one of the switches 112, 113 is not connected to the impedance I_1.

The transmitter device D_TX is also configured to carry out, on the grounds of at least one power measurement acquired, processing with the aim of determining at least one location for backscattering, by implementing all or part of the steps of a method for determining said at least one location.

For this purpose, the transmitter device D_TX for example includes one or more processors and memory storage means (magnetic hard disk, electronic memory, optical disk etc.) in which are stored data and a computer program, in the form of a set of program code instructions to be executed to implement at least a part of the steps of the determining method.

Alternatively or additionally, the transmitter device D_TX also includes one or more programmable logic circuits, of FPGA, PLD, etc. type, and/or specialized integrated circuits (ASIC), and/or a set of discrete electronic components, etc. suitable for implementing all or part of the steps of the determining method.

In other words, the transmitter device D_TX includes a set of means configured in software (specific computer program) and/or hardware (FPGA, PLD, ASIC, etc.) to implement all or part of the steps of the determining method.

Besides the fact of allowing the determination of at least one location for backscattering, said means configured in software and/or hardware also make it possible to steer the movement of the transmitter device D_TX.

For this purpose, these means for example include a steering module (not shown in the figures) configured to generate commands for moving the transmitter device D_TX. Such commands may be generated independently of the state (backscattering or non-backscattering) of the transmitter device D_TX.

For example, said commands are generated without assistance. In other words, the transmitter device D_TX is able to be moved in the area Z_T autonomously, i.e. without the involvement of an operator.

Alternatively, the steering of the transmitter device D_TX is done with assistance from an operator who remotely generates command signals, these control signals then being transmitted to said transmitter device D_TX which moves as a function of the data conveyed in these signals. For this purpose, the transmitter device D_TX for example includes communication means for the reception of said control signals, said signals being then processed by the steering module. These communicating means are based, in a manner known per se, on a communication interface able to exchange data between said operator and said transmitter device D_TX. No limitation is attached to the nature of this communication interface, which can be wired or wireless, such as to allow the exchange of data according to any protocol known to those skilled in the art (Ethernet, WiFi, Bluetooth, 3G, 4G, 5G, etc.). Neither does anything preclude, according to another example, control signals being received via the antenna 111 of the transmitter device D_TX.

For the remainder of the description, it is considered without any limitation that the operation of the transmitter device D_TX is ensured by an electrical energy that the latter is able to store.

For example, said electrical energy is contained in an electrical battery integrated into said transmitter device D_TX, and can for example be recharged by means of solar panels equipping said transmitter device D_TX, or else by its capacitive effect, such that the transmitter device D_TX is energetically autonomous. Alternatively, the recharging of said battery is carried out via a connection to the domestic electrical network.

Nothing however precludes the considering of other types of energy, such as for example a form of fossil fuel energy, particularly in the case where the transmitter device D_TX is equipped with a thermal motor. And finally, nothing precludes the considering of a mix of energy types (electrical and thermal).

In other words, and in general, no limitation is attached to the energy considered for the operation of the transmitter device D_TX, or even the way in which this energy is obtained thereby.

The receiver device D_RX, meanwhile, is configured, in a manner known per se, to:
  receive the ambient signal emitted by the source 20, including any reflections and diffractions undergone by the waves of this signal due to elements placed in the environment in which the transmitter devices D_TX and receiver devices D_RX are located,
  receive the backscattered signal coming from the transmitter device D_TX.

Typically, said receiver device D_RX includes at least one receiving antenna. This aspect being well-known to those skilled in the art, it will not be further detailed here.

Furthermore, and as stated above, the receiver device D_RX is configured to carry out processing in the aim of decoding the backscattered signal, implementing a decoding method.

For this purpose, the receiver device D_RX includes for example one or more processors and memory storing means (magnetic hard disk, electronic memory, optical disk etc.) in which are stored data and a computer program, in the form of a set of program code instructions to be executed to implement said decoding method.

Alternatively or additionally, the receiver device D_RX also includes one or more programmable logic circuits, of FPGA, PLD, etc. type, and/or specialized integrated circuits (ASIC), and/or a set of discrete electronic components, etc. suitable for implementing said decoding method.

In other words, the receiver device D_RX includes a set of means configured in software (specific computer program) and/or hardware (FPGA, PLD, ASIC, etc.) to implement said decoding method.

The aspects related to the decoding techniques used depart from the scope of this invention, and are further known to those skilled in the art. Consequently they will not be further discussed here.

It should however be noted that the decoding can only be implemented if the power contrast C_P exceeds a predetermined threshold, the so-called "power threshold" S_P. Such a power threshold is for example defined on the basis of a predetermined error decoding rate as well as the reception noise on the receiver device D_RX side.

Specifically, in the context of ambient backscattering, the power received by the receiver device D_RX varies according to whether the transmitter device D_TX is in the backscattering state or else the non-backscattering state.

Effectively, when the transmitter device D_TX backscatters, the power radiated directly to the receiver device D_RX is added to that from the backscattering. The term "directly" here refers to radiation generated by waves of the ambient signal that have not been backscattered.

Thus, it matters that the transmitter device D_TX can occupy a location in which the power radiated by the source 20 is sufficient, so as to cause an increase in the power contrast evaluated by the receiver device D_RX, and so that the power threshold S_P is finally reached.

In practice, the power contrast C_P can be evaluated as per the following formula:

$$C\_P = |P\_R - P\_NR|.$$

In this formula, PR (or PNR respectively) corresponds to the power received by the receiver device D_RX when the transmitter device D_TX is in the backscattering state (or the non-backscattering state respectively). Thus, a condition according to which the decoding can be implemented is here expressed as C_P>S_P. It will hence be understood that the reaching of the threshold S_P depends on the deviation between P_R and P_NR.

It should however be noted that although the decoding can be theoretically implemented as long as C_P>S_P, nothing precludes a more restrictive decoding condition from being imposed on the receiver device D_RX, such as for example C_P>N*S_P where N is a real number strictly greater than 1. Imposing a more restrictive condition makes it possible to increase the communication quality between the transmitter D_TX and receiver devices D_RX.

Figure 4:
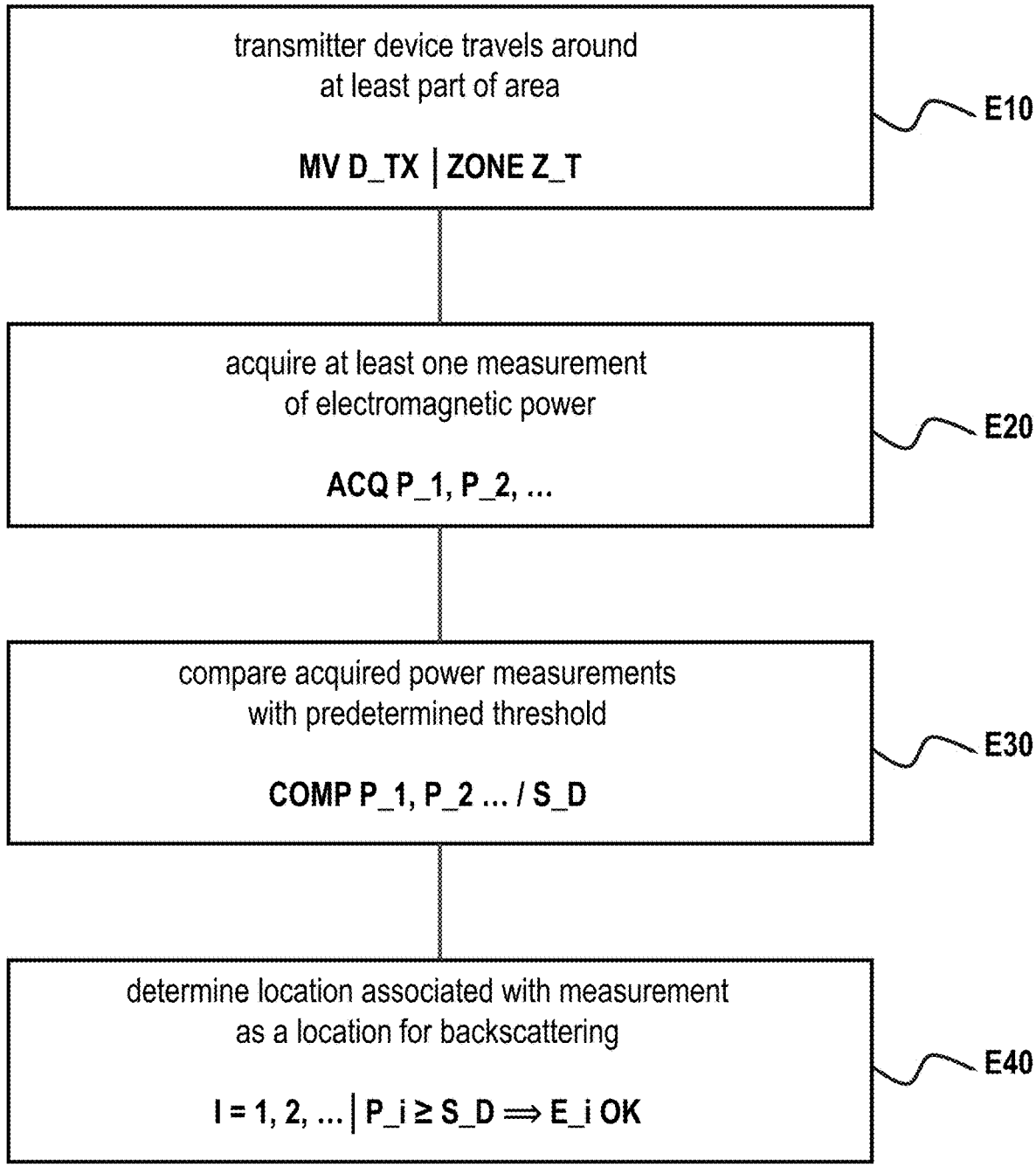
FIG. 4 shows, in the form of a flowchart, the main steps of a method for determining at least one location for backscattering according to the invention.

FIG. 4 shows, in the form of a flow chart, the main steps of the method for determining at least one location according to the invention.

Said determining method is implemented by the transmitter device D_TX when it is in the non-backscattering state.

Said determining method includes several steps. According to its general principle, it consists in taking at least one measurement of electromagnetic power when the transmitter device D_TX travels, in order to be able to locate a location at which the electromagnetic power generated by the source 20 is sufficient for the power contrast C_P to be able to reach the power threshold S_P.

For the rest of the description, and purely by way of illustration, it is considered that the distribution of power radiated by the source 20 at the time when the determining method is implemented is in accordance with the distribution shown by FIG. 1. It is also considered that the area Z_T associated with the transmitter device D_TX corresponds to that indicated in FIG. 1.

It is further considered that the transmitter device D_TX occupies, before the implementation of said determining method, an initial location equivalent to the center of the square forming the area Z_T. It should however be noted that no limitation is attached to the location of said initial location within, or else along the border, of said area Z_T.

As illustrated by FIG. 4, said determining method includes a step E10 of the transmitter device D_TX travelling around at least a part of the area Z_T.

Such traveling of the transmitter device D_TX allows the latter to at least partly scan the area Z_T for the purpose of discovering in it at least one location in which the power radiated by the source 20 is sufficient for the receiver device D_RX to be able to decode the signal that will be backscattered.

The term "travel" here refers to a phase of exploration, this phase being able to comprise a continuous movement (i.e. without stopping inside said part) between initial and final locations respectively in which the transmitter device D_TX is fixed, or else able to be done fractionally (i.e. with one or more intermediate stops inside said part before reaching a final location.)

In a particular embodiment, the travel of the transmitter device D_TX is done autonomously, i.e. without external assistance. For example, said transmitter device D_TX is configured to analyze the environment in which it is found, in order to detect any obstacles that it can then circumvent. Such a detection is typically implemented using imaging means (for example a camera) equipping the transmitter device D_TX, and using processing implemented by said device D_TX and with the aim of analyzing images obtained with said imaging means. Such processes are well-known to those skilled in the art and will therefore not be further detailed here.

In another particular mode of implementation, the travel of the transmitter device D_TX is done with assistance, for example by an operator able to remotely control the movements of the transmitter device D_TX.

Whatever the mode of implementation under consideration (autonomous or assisted), the travel of the transmitter device D_TX can be along a predetermined trajectory, such as for example a spiral, a castellated line, etc.

Alternatively, the transmitter device D_TX can move non-deterministically.

In general, no limitation is attached to the trajectory followed by the transmitter device D_TX.

Moreover, said part of the area Z_T is for example configured such as to comprise the initial location of the transmitter device D_TX.

By way of illustration, with reference to FIG. 1, said part corresponds to one half (for example the left half) of the square formed by the area Z_T. Thus, the initial location belongs to the border of said part.

Alternatively, said part does not comprise the initial location, such that the transmitter device D_TX makes a previous movement to join said part, which it then travels around.

In general, no limitation is attached to the shape exhibited by said part of the area Z_T. In addition, the travel of the transmitter device D_TX can occur during a predetermined time which can be parameterized, such that the shape of said part can depend on this predetermined time.

In a particular embodiment, the transmitter device D_TX moves around the entire area Z_T. Proceeding in this way makes it possible to maximize the probability of finding a local power maximum during the travel of the transmitter device D_TX.

The determining method also includes, during the travel of the transmitter device D_TX, a step E20 of acquiring at least one measurement of electromagnetic power received by said transmitter device D_TX.

For the remainder of the description, it is considered without limitation that a plurality of power measurements P_1, P_2, . . . are intended to be acquired in said part of the area Z_T.

As mentioned above, said measurements P_1, P_2, . . . are acquired in the work band B_T associated with the transmitter device D_TX. They are moreover acquired at respective locations E_1, E_2, . . . of the part within which the transmitter device D_TX is travelling.

Such acquisitions are preferably made when stopped (fractional exploration phase). In other words, when it is traveling, the transmitter device D_TX makes stops as soon as it wishes to acquire an electromagnetic power measurement.

Nothing however precludes considering that said measurements P_1, P_2, . . . are acquired while the transmitter device D_TX is in motion.

In a particular mode of implementation, said measurements P_1, P_2, . . . are acquired at a time increment, for example parameterizable, determined between each location E_1, E_2, . . . . To do this, the transmitter device D_TX moves for example at constant speed.

According to another example, or else as a supplement to the previous one in which a predetermined time increment is considered, said measurements P_1, P_2, . . . are acquired at a predetermined distance increment, for example parameterizable, between each location E_1, E_2, . . . .

The number of measurements P_1, P_2, . . . acquired corresponds for example to a predetermined number. It should however be noted that no limitation is attached to the number of power measurements that can be acquired. Thus, the invention remains applicable in the situation where a single power measurement is acquired.

Furthermore, nothing precludes considering a power measurement acquired in the initial location when the transmitter device D_TX is stopped.

The determining method also includes a step E30 of comparing said power measurements P_1, P_2, . . . acquired with a predetermined threshold S_D.

This comparing step E30 is here implemented by a comparing module equipped the transmitter device D_TX. It should be noted that although this step E30 is here described as being implemented when said transmitter device D_TX is in the non-backscattering state, nothing precludes considering, according to a particular exemplary embodiment, that said comparing module is also able to make such a comparison during a backscattering state.

The threshold considered here for the comparison is determined as a function of the power threshold S_P associated with the receiver device D_RX and mentioned above. Those skilled in the art know how to set a threshold S_D on the basis of which a location can be considered for the backscattering.

For example, in order to compensate for the fact that the receiver device D_RX can occupy a fixed position at a location where the power distribution generated by the source 20 (FIG. 1) is at a minimum, said threshold S_D is chosen high enough, for example greater than the power threshold S_P of the receiver device D_RX.

The comparison made during the step E30 is for example implemented each time a power measurement is acquired.

Alternatively, said comparison is implemented once a predetermined travel time has elapsed and/or when a predetermined number of measurements have been acquired, said measurements being in this case stored in the memory by the transmitter device D_TX during its travel.

According to yet another alternative, or else in addition to the previous alternatives, said comparison is implemented once the entire part of the area Z_T, or even the entirety of said area Z_T where applicable, has been traveled.

A location E_1, E_2, . . . associated with a measurement P_1, P_2, . . . is then determined, during a step E40 of the determining method, as being a location for backscattering if the measurement associated with this location is above said threshold S_D.

This determining step E40 is here implemented by a determining module equipping the transmitter device D_TX. It should be noted that although this step E40 is here described as being implemented when said transmitter device D_TX is in the non-backscattering state, nothing precludes considering, according to a particular exemplary embodiment, that said determining module is also able to make such a determination during a backscattering state.

It is therefore a question of making a sort from among the locations E_1, E_2, . . . at which measurements P_1, P_2, . . . have been acquired.

According to an exemplary embodiment, when the comparison of the measurements P_1, P_2, . . . with the threshold S_D is carried out each time a power measurement is acquired, the step E40 of determining is stopped as soon as an acquired measurement is determined to be above the threshold S_D.

Thus, in this example, if the first measurement P_1 acquired by the transmitter device D_TX is taken at its initial location, and that this measurement P_1 is above the threshold S_D, said transmitter device D_TX remains immovable.

Proceeding in this way not only makes it possible to determine a location such that the backscattered signal can be decoded by the receiver device D_RX, but also to optimize the energy consumption of the transmitter device D_TX.

By way of illustrative example, and with reference to FIG. 1, the transmitter device D_TX travels around the entire part corresponding to the left half of the square formed by the area Z_T. Furthermore, in this example, the comparison of the measurements acquired is made once the whole of said part has been traveled, the measurements having been acquired according to a distance increment equal to 2 cm. After its travel, the transmitter device D_TX has determined two locations for backscattering located inside the areas Z_1 and Z_2 respectively.

Figure 5:
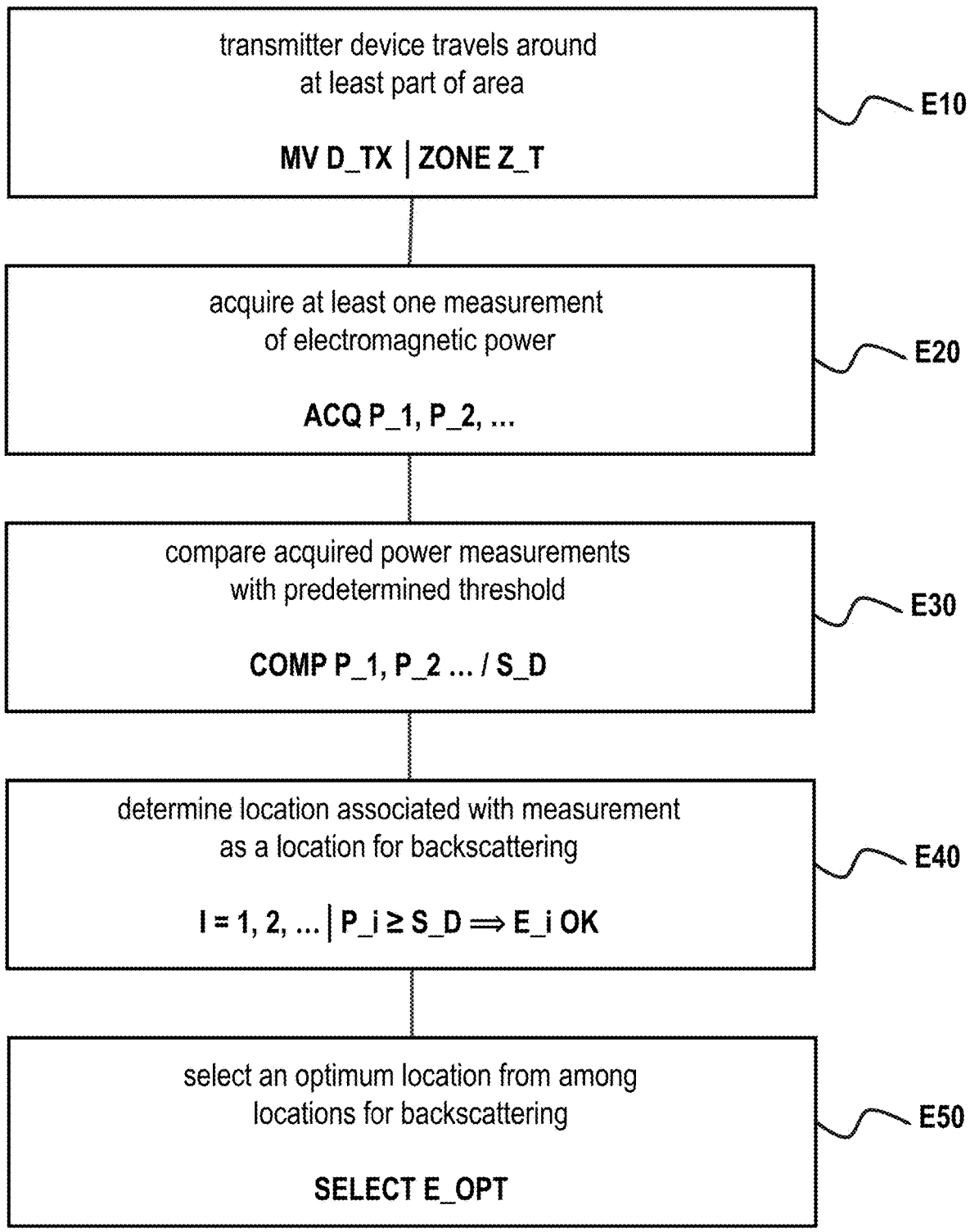
FIG. 5 schematically represents a preferred mode of implementation of the determining method of FIG. 4.

FIG. 5 schematically represents a preferred mode of implementation of the determining method of FIG. 4.

In this preferred method of implementation, a plurality of locations is considered during the acquiring step E20. Furthermore, and as illustrated by FIG. 5, said determining method includes, when several locations are determined as being locations for backscattering, a step E50 of selecting, from among the locations for backscattering, a location, the so-called "optimal location" E_OPT, for which the associated power measurement is a maximum from among the power measurements associated with said locations for backscattering.

Said optimal location E_OPT therefore denotes a location in which the power received from the source 20 is maximized, such that the power received by the receiver device D_RX is also at a maximum when the transmitter device D_TX occupies said optimal location E_OPT to backscatter. In this way, the communication between these devices D_TX, D_RX is optimized.

Repeating the illustrative example mentioned above, and in which two locations have been determined in the areas Z_1 and Z_2, the optimal location E_OPT selected corresponds, for example, finally to the location associated with the area Z_1.

The invention also relates to a method for backscattering the ambient signal by the transmitter device D_TX toward the receiver device D_RX.

Figure 6:
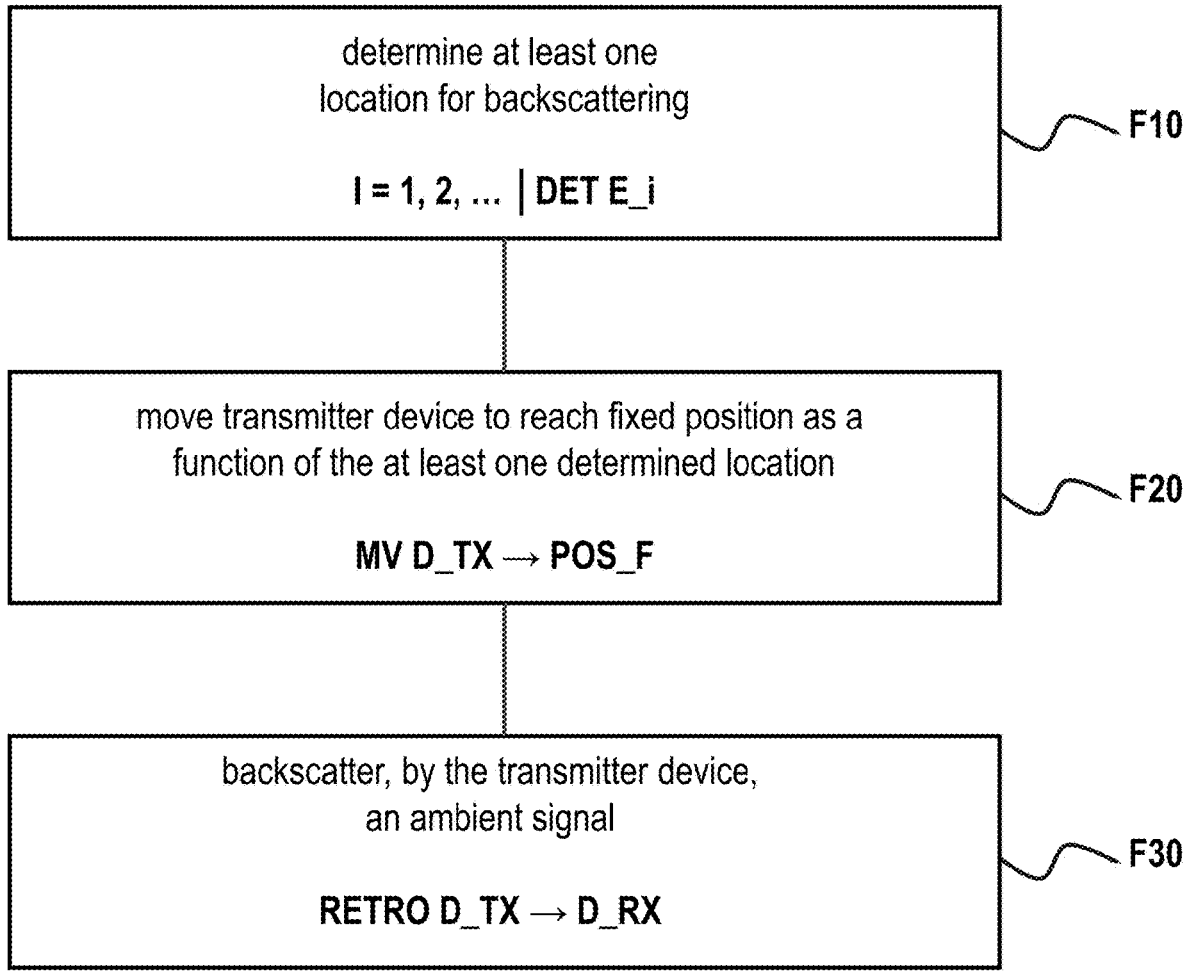
FIG. 6 shows, in the form of a flowchart, the main steps of a backscattering method according to the invention.

FIG. 6 shows, in the form of a flowchart, the main steps of said backscattering method.

As illustrated by FIG. 6, said backscattering method includes, firstly, a step F10 of determining at least one location for backscattering.

Such a determining step F10 is done in accordance with the determining method described above.

Subsequently, and when at least one location has been determined and the transmitter device D_TX is in the non-backscattering state, said backscattering method includes a step F20 of moving the transmitter device D_TX in the area Z_T, such as to reach a fixed position POS_F as a function of said at least one determined location.

For example, said fixed position POS_F corresponds to an identical position to that occupied by the transmitter device D_TX when it has taken the measurement associated with said at least one predetermined location. The term "identical position" should be understood to mean that, if the transmitter device D_TX is equipped with several antennas, the relative positions (in terms of geographical coordinates) of said antennas, when the transmitter device D_TX reaches said fixed position POS_F, correspond exactly to the relative positions of the antenna at the time when the measurement associated with said at least one location has been acquired.

The choice of such a fixed position POS_F only constitutes a single variant of implementation of the invention. For example, the transmitter device D_TX can occupy a fixed position POS_F at which the position (in terms of geographical coordinates) of its center of gravity is identical to the position of its center of gravity at the time when the measurement associated with said at least one location has been acquired. Although there is a correspondence concerning the position of the center of gravity, the relative positions of the antennas for said fixed position can however differ from the relative positions of the antenna at the time when the measurement associated with said at least one location has been acquired.

It should be noted that if several locations are determined, the fixed position POS_F is for example a function of the position of the transmitter device D_TX when it has taken the electromagnetic power measurement associated with any one of said predetermined locations.

Preferably, when an optimal location E_OPT is selected, said fixed position POS_F is identical to the position of the transmitter device D_TX when it has taken the electromagnetic power measurement associated with said optimal location E_OPT.

Once the device D_TX has reached said fixed position POS_F, the backscattering method includes a step F30 of the backscattering, by the transmitter device D_TX, of the ambient signal. To do this, said device D_TX goes from the non-backscattering state to the backscattering state.

In a particular mode of implementation, the steps F10 of determining at least one location, of moving F20 the transmitter device such as to reach a fixed position POS_F, and backscattering F30 are iterated recurrently.

Performing these steps recurrently makes it possible to take into account the variability of the environment in which are positioned the transmitter device D_TX and the receiver device D_RX.

For example, said steps are iterated periodically, for example once a day in an environment in which the power distribution is stable, or else more, for example once every hour if the power distribution is liable to vary substantially every hour.

The invention has until now been described by considering that the transmitter device D_TX was associated with a single backscattering state as well as a single non-backscattering state. The invention nonetheless remains applicable in the case where the transmitter device D_TX is associated with a plurality of backscattering states, these states being separate from one another in that they are implemented using mutually separate respective impedances. It will of course be understood that the non-backscattering state, meanwhile, remains single.

Those skilled in the art know how to adapt the configuration of the transmitter device D_TX as shown in FIG. 3 to take into consideration several backscattering states. For example, with reference to FIG. 3, several mutually separate impedances can be arranged in parallel between the switches 112, 113.

Moreover, the invention has until now also been described considering a single transmitter device D_TX. The invention, however, remains applicable in the case where a plurality of transmitter devices D_TX is considered. For example, when a plurality of transmitter devices D_TX is considered, the steps of the method for determining at least one location (step E10 of traveling, step E20 of acquiring, step E30 of comparing, step E40 of determining, and step E50 of selecting where applicable) are implemented by each of said devices D_TX when said transmitter devices D_TX are simultaneously in the non-backscattering state. To ensure such a simultaneity, said transmitter devices D_TX are for example synchronized with one another by GPS (Global Positioning System) and each observe one and the same duration of non-backscattering according to a period which is also common to them, such a duration and such a period being for example defined in a telecommunication standard. Preferably, once said transmitter devices D_TX are moved to reach their respective fixed positions (step F20), they simultaneously backscatter the ambient signal (step F30).

The invention claimed is:

1. A method for determining at least one location for backscattering, by at least one transmitter device and to at least one receiver device, an ambient radio signal emitted in an emission band, the emission band comprising a frequency band, said transmitter device being associated with:
    an area that is a function of said emission band,
    a plurality of operating states, the plurality of operating states including at least one backscattering state and an opposite non-backscattering state, and
    a work band included in said emission band,
    said method being implemented by the transmitter device when the transmitter device is in the non-backscattering state, said method including:
    the transmitter device traveling around at least one part of said area,
    during the traveling of the transmitter device, acquiring, in the work band and in at least one location of said part of the area, an electromagnetic power measurement received by said transmitter device, and
    comparing said at least one electromagnetic power measurement with a predetermined threshold, said at least one location associated with said electromagnetic power measurement being determined as being a location for backscattering if said electromagnetic power measurement is above said predetermined threshold.

2. The method of claim 1, wherein the transmitter device traveling around at least one part of said area comprises moving around all parts of said area.

3. The method of claim 1, wherein the transmitter device travels around autonomously or with assistance.

4. The method of claim 1, wherein a plurality of locations in said at least one part of the area are considered during the acquiring step, each electromagnetic power measurement being acquired according to a predetermined time increment or according to a predetermined distance increment between each location of said plurality of locations in said at least one part of the area.

5. The method of claim 1, wherein a plurality of locations in said at least one part of the area are considered during the acquiring step, said method including, when several locations are determined as being locations for backscattering, selecting, from among said locations for backscattering, an optimal location for which an associated electromagnetic power measurement is at a maximum among electromagnetic power measurements associated with said locations for backscattering.

6. The method of claim 1, wherein a plurality of transmitter devices are considered, the method being implemented by each of said plurality of transmitter devices when said transmitter devices are simultaneously in the non-backscattering state.

7. A method for backscattering, by at least one transmitter device and to at least one receiver device, an ambient radio signal transmitted in an emission band, the emission band comprising a frequency band, said transmitter device being associated with:
    an area that is a function of said emission band,
    at least two operating states, the at least two operating states including at least a backscattering state and an opposite non-backscattering state, and
    a work band included in said emission band,
    said method including:
    determining at least one location for backscattering using the method of claim 1,
    when the at least one location has been determined and the transmitter device is in the non-backscattering state, moving the transmitter device in the area, such as to reach a fixed position that is a function of said at least one determined location, and
    backscattering, by the transmitter device, of the ambient signal.

8. The method of claim 7, wherein a plurality of locations in said at least one part of the area are considered during the acquiring step, the method including, when several locations of the plurality of locations are determined as being locations for backscattering, selecting, from among said locations for backscattering, an optimal location for which an associated electromagnetic power measurement is at a maximum among electromagnetic power measurements associated respectively with said locations for backscattering, and wherein the fixed position is identical to a position of the transmitter device when it has taken the electromagnetic power measurement associated with said optimal location.

9. The method of claim 7, wherein the steps of determining at least one location, of moving the transmitter device such as to reach a fixed position, and backscattering are iterated recurrently.

10. A non-transitory, computer readable medium having stored thereon instructions which, when executed by a processor, cause the processor to implement a method for determining at least one location for backscattering, by at least one transmitter device and to at least one receiver device, an ambient radio signal emitted in an emission band, the emission band comprising a frequency band, said transmitter device being associated with:
    an area that is a function of said emission band,
    a plurality of operating states, the plurality of operating states including at least one backscattering state and an opposite non-backscattering state,
    a work band included in said emission band,
    said method being implemented by the transmitter device when the transmitter device is in the non-backscattering state, said method including:

the transmitter device traveling around at least one part of said area, during the traveling of the transmitter device, acquiring, in the work band and in at least one location of said part of the area, an electromagnetic power measurement received by said transmitter device, and comparing said at least one electromagnetic power measurement with a predetermined threshold, said at least one location associated with said electromagnetic power measurement being determined as being a location for backscattering if said electromagnetic power measurement is above said predetermined threshold.

11. A non-transitory, computer readable medium having stored thereon instructions which, when executed by a processor, cause the processor to implement a method for backscattering, by at least one transmitter device and to at least one receiver device, an ambient radio signal transmitted in an emission band, the emission band comprising a frequency band, said transmitter device being associated with:

an area that is a function of said emission band, at least two operating states, the at least two operating states including at least a backscattering state and an opposite non-backscattering state, a work band included in said emission band, said method including:

determining at least one location for backscattering using the method of claim 1, when the at least one location has been determined and the transmitter device is in the non-backscattering state, moving the transmitter device in the area, such as to reach a fixed position that is a function of said at least one determined location, and backscattering, by the transmitter device, of the ambient signal.

12. A transmitter device for backscattering toward at least one device for receiving an ambient radio signal emitted in an emission band, the emission band comprising a frequency band, said transmitter device being associated with:

an area which is a function of said frequency band, a plurality of operating states, the plurality of operating states including at least one backscattering state and an opposite non-backscattering state, a work band included in said emission band, said transmitter device including:

means for moving through said area, acquiring means, configured to acquire, in the work band and in at least one location of said area, when the transmitter device is in the non-backscattering state, an electromagnetic power measurement received by said transmitter device, a comparing module, configured to compare said electromagnetic power measurement with a predetermined threshold, and a determining module, configured to determine, when said electromagnetic power measurement is above said predetermined threshold, that the at least one location associated with said electromagnetic power measurement is a location for backscattering.

13. The transmitter device of claim 12, said transmitter device further comprising a steering module, configured to control, when said location for backscattering has been determined, a movement of the transmitter device in the area, such as to reach a fixed position as a function of said determined location for backscattering.

14. A communication system including at least one transmitter device of claim 12 and at least one receiver device.

* * * * *